Aug. 25, 1942.  L. M. PERSONS  2,293,947
GAS VALVE
Filed Sept. 19, 1938   5 Sheets-Sheet 1
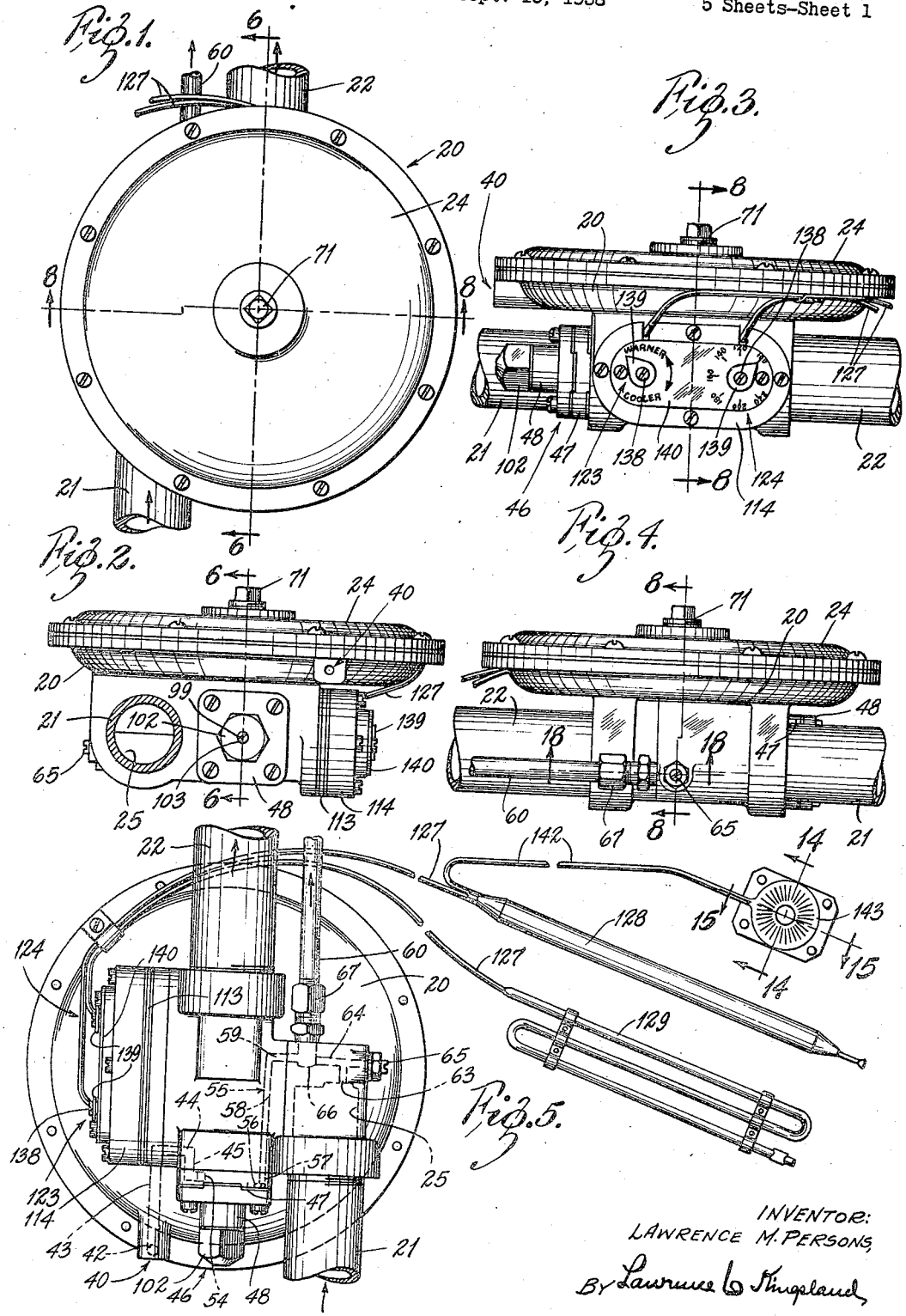
INVENTOR:
LAWRENCE M. PERSONS
By Lawrence C. Kingsland
ATTORNEY.

Aug. 25, 1942.   L. M. PERSONS   2,293,947
GAS VALVE
Filed Sept. 19, 1938   5 Sheets-Sheet 2
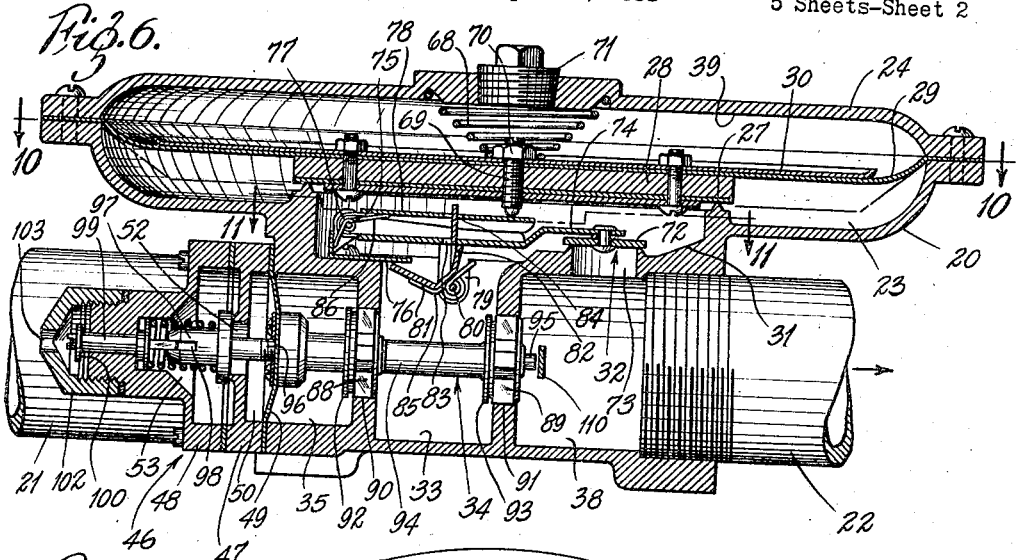
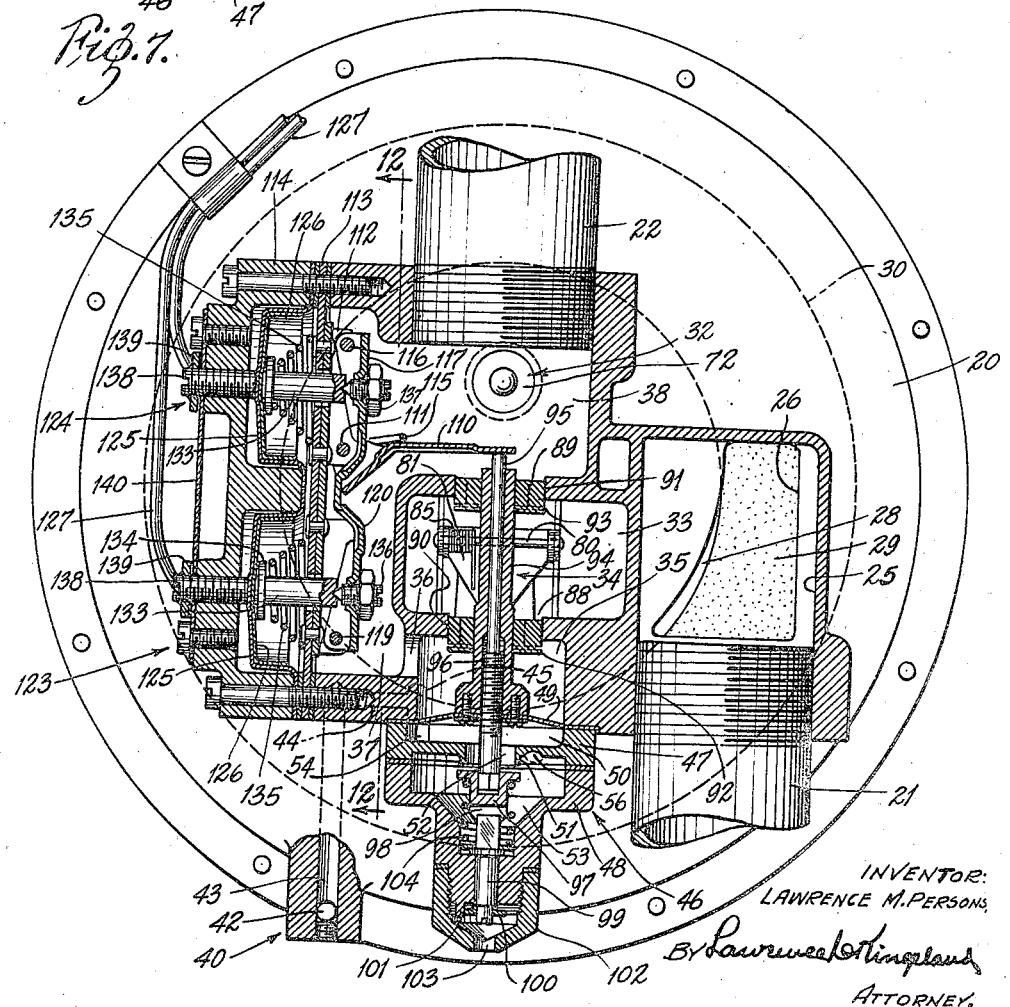
INVENTOR:
LAWRENCE M. PERSONS
By Lawrence O. Tingland
ATTORNEY.

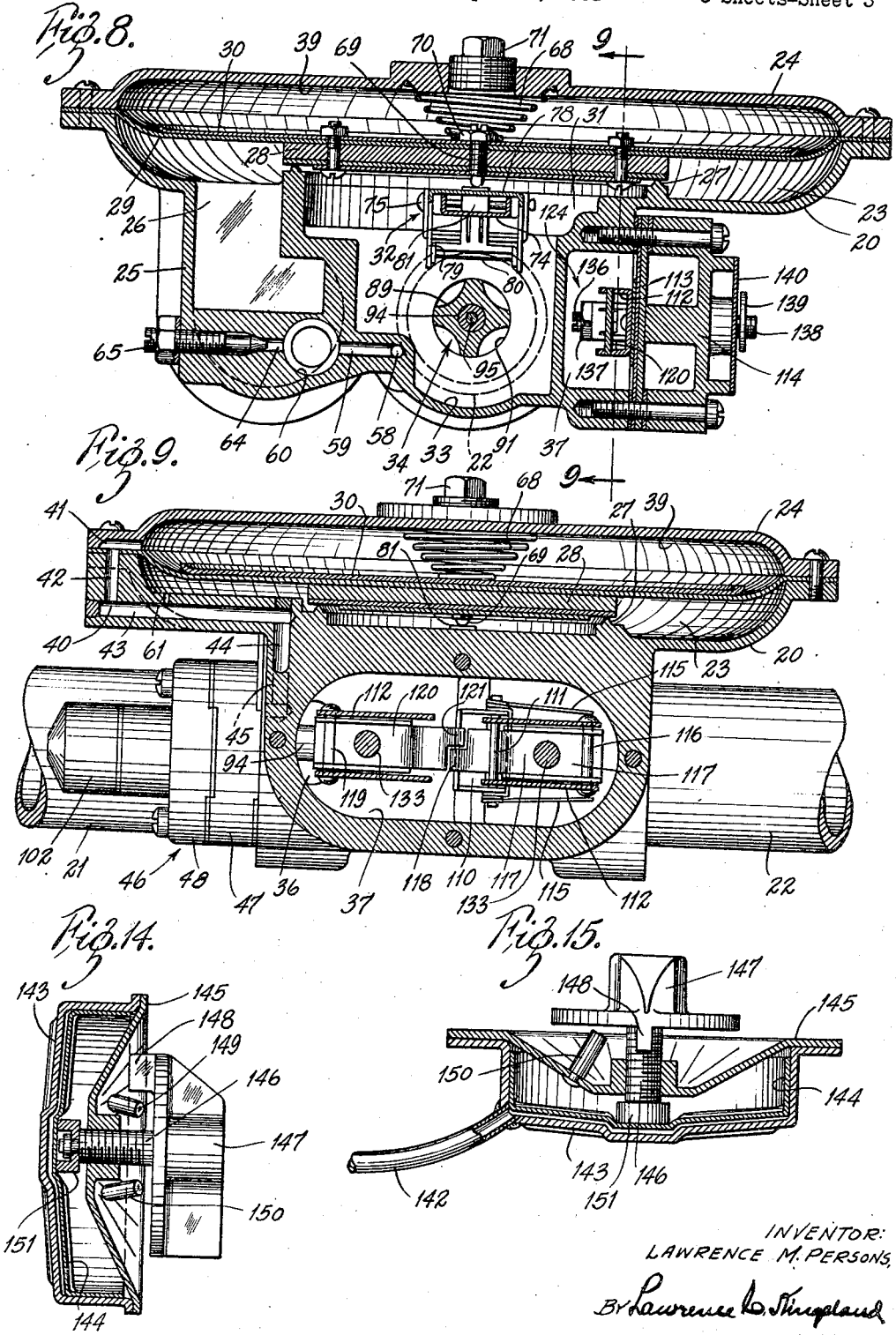

Aug. 25, 1942.   L. M. PERSONS   2,293,947
GAS VALVE
Filed Sept. 19, 1938   5 Sheets-Sheet 4
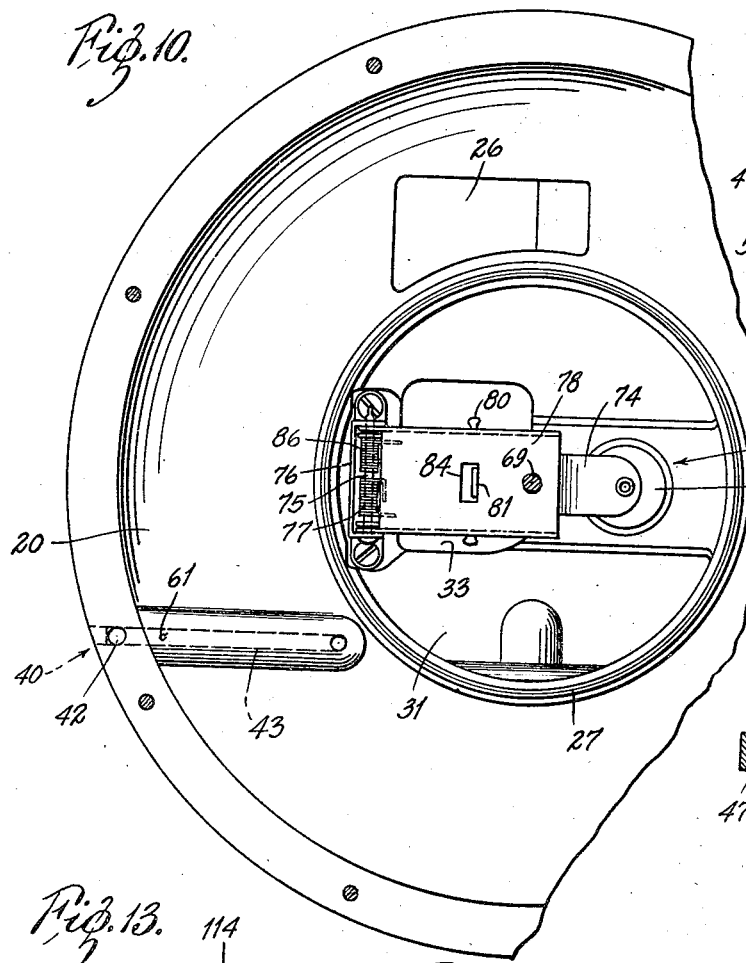
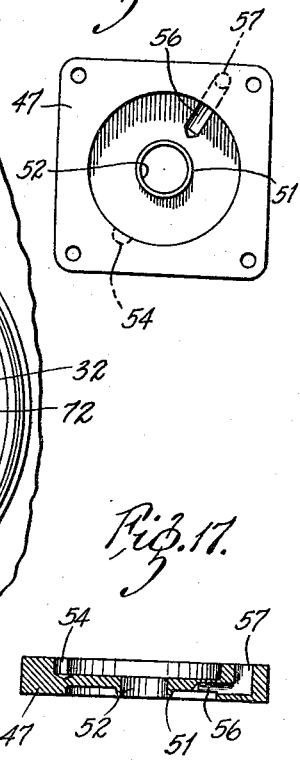
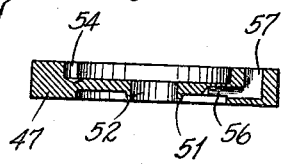
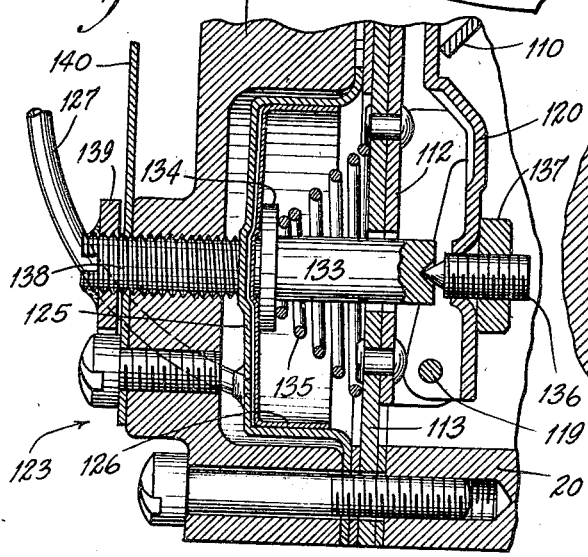
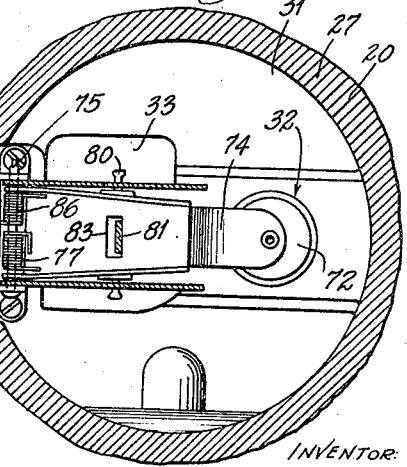
INVENTOR:
LAWRENCE M. PERSONS,
By Lawrence C. Kingsland
ATTORNEY.

Aug. 25, 1942.   L. M. PERSONS   2,293,947
GAS VALVE
Filed Sept. 19, 1938   5 Sheets-Sheet 5
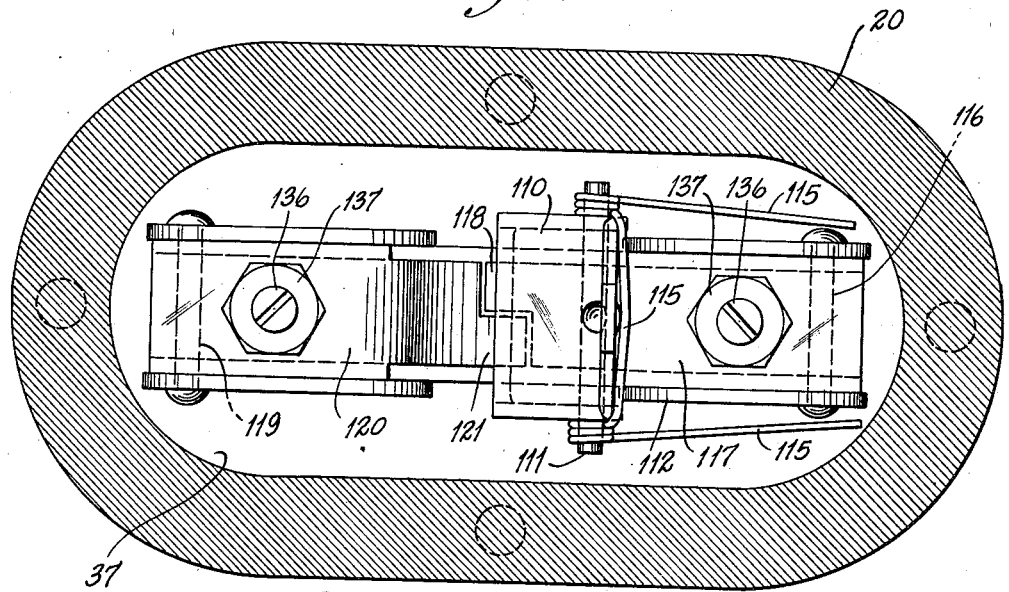
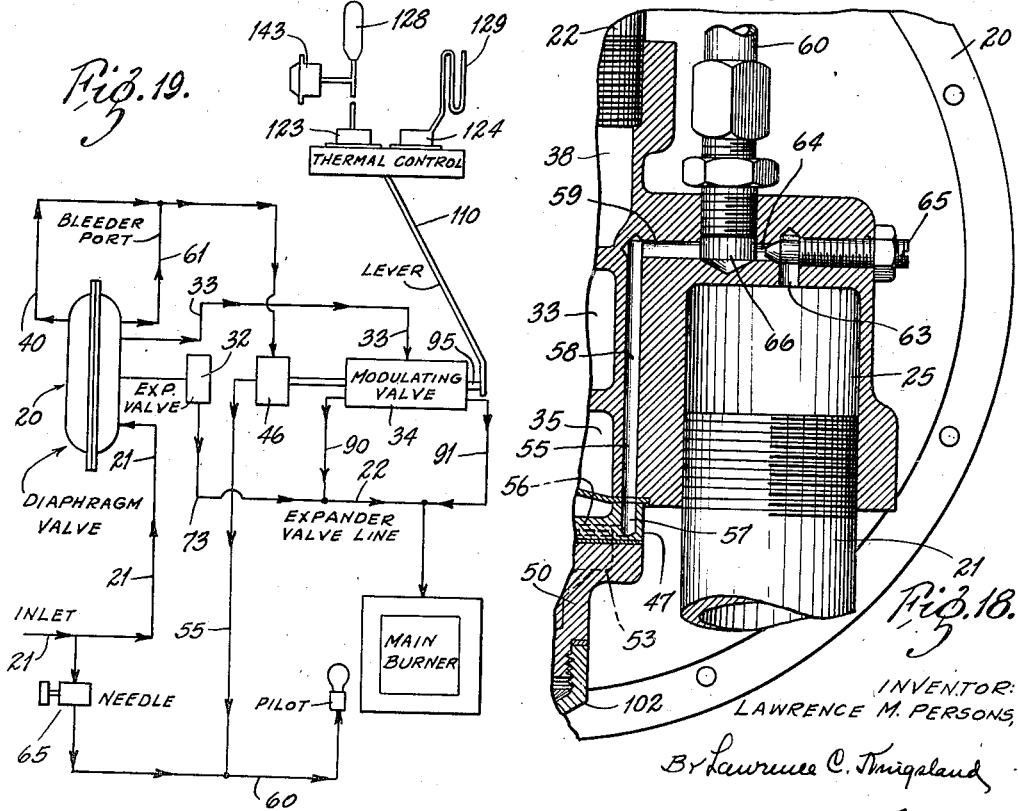
INVENTOR:
LAWRENCE M. PERSONS,
By Lawrence C. Kingsland
ATTORNEY.

Patented Aug. 25, 1942

2,293,947

UNITED STATES PATENT OFFICE 2,293,947

GAS VALVE

Lawrence M. Persons, St. Louis County, Mo., assignor to Automatic Control Corporation, St. Louis, Mo., a corporation of Delaware Application September 19, 1938, Serial No. 230,593

17 Claims. (Cl. 236—80)

The present invention comprises a gas valve.

It has for its objects the provision of a valve that may be used as a modulating valve; that is controlled by either of two thermal elements at least one of which provides remote control, and the provision of a combined cut-off and modulating valve; that provides for a full discharge of gas for the ignition of the burner, which full charge is automatically cut down when the valve modulates; and that provides an adjustable flow of gas during the modulation.

A further object of the valve is to provide a temperature controlled modulating valve, the movements of which in modulation are positive and definite for any given temperature condition, which objective has been attained by the use of a solid-charge thermostatic control of the modulating valve.

Further objects include the provision of a balanced modulating valve, especially when combined with a cut-off valve; and means to adjust the cut-off valve relative to the modulating valve.

Other objects are the provision of a diaphragm valve with a thermally controlled cut-off that exhausts the pressure chamber of the diaphragm into the pilot burner.

In the drawings:

Fig. 1 is a plan view of the device;

Fig. 2 is a front elevation thereof;

Fig. 3 is an elevation from the right of Fig. 2;

Fig. 4 is an elevation from the left of Fig. 2;

Fig. 5 is a bottom view;

Fig. 6 is a vertical half section on the line 6—6 of Fig. 1;

Fig. 7 is a horizontal section taken through the axes of the inlet and outlet pipes of Fig. 3;

Fig. 8 is a vertical section taken on the line 8—8 of Figs. 3 and 4;

Fig. 9 is a vertical section taken on the line 9—9 of Fig. 8;

Fig. 10 is a view with the upper cover and diaphragm removed taken on the line 10—10 of Fig. 6;

Fig. 11 is a horizontal section on the line 11—11 of Fig. 6;

Fig. 12 is a vertical section taken approximately on the line 12—12 of Fig. 7;

Fig. 13 is an enlarged view of the lower thermal element shown in Fig. 7;

Fig. 14 is a section of the remote control taken on the line 14—14 of Fig. 5;

Fig. 15 is a similar section taken on the line 15—15 of Fig. 5;

Fig. 16 is an elevation of the valve seat member shown in Fig. 7;

Fig. 17 is a sectional view thereof;

Fig. 18 is a section of the pilot valve and assembly, taken on the line 18—18 of Fig. 4, but turned to the position of Fig. 5; and Fig. 19 is an operating diagram of the device.

The valve itself includes a casing 20 to which leads a gas inlet 21 and from which leads a gas outlet 22. This casing includes a large circular diaphragm-containing chamber 23 having a detachable cover 24. The casing likewise has an inlet portion 25 receiving the inlet pipe 21. This inlet portion 25 has a passageway 26 (Fig. 8) leading to the diaphragm chamber 23. The diaphragm chamber has an annular valve seat 27 that receives a leather-faced valve 28 secured to a flexible diaphragm 29 faced with a plate 30. The diaphragm 29 is clamped between the connection of the cover 24 and the walls of the chamber 23.

The valve chamber proper (Fig. 6) includes an upper section 31 in which is located an expander valve 32 to be described and a lower modulating chamber 33 controlled by a modulating valve 34 to be described.

The outlet portion of the valve housing beyond the modulating valve includes a chamber 35 communicating by a passage 36 (Fig. 7) into a thermal unit chamber 37 which, in turn, leads into an outlet chamber 38 from which extends the outlet pipe 22.

It will be seen that the inlet chamber 25 communicates directly to the diaphragm chamber 23 beneath the diaphragm but is cut off by the diaphragm valve 28 from the modulating valve chamber 33. Furthermore, the modulating valve chamber 33 is cut off by the modulating valve 34 from both the chamber 35 leading into the chamber 37, and directly from the chamber 38, both chambers 37 and 38 leading to the outlet pipe. It also may be seen that direct connection by-passing the modulating valve may be had from the upper chamber 34 directly to the outlet 22 through the expander valve 32.

The casing 24 and the diaphragm 29 form an upper section 39 above the diaphragm. The upper chamber communicates with a cut-off valve through a passage generally indicated at 40. It includes a port 41 (Fig. 9) extending into the margin of the cover 24 from the chamber 40 into communication with a port 42 in the valve housing. This, in turn, communicates with a second port 43 in the housing, communicating with an additional port 44 extending angularly downward to register with a port 45 leading to the edge of the housing.

At this point on the housing, a cut-off valve 46 is located. It includes a seat member 47 surmounted by a valve cap 48, and both are secured to the casing as by screws. A diaphragm 49 is clamped between the main housing and the valve seat member 47. This diaphragm is attached centrally to the modulating valve 34 and seals off a chamber 50 from the chamber 35.

The valve seat member 47 has centrally an annular valve seat 51 providing a passage 52 between the chamber 50 and a chamber 53 in the valve cap member 47.

The previously mentioned port 45 continues at 54 into the valve seat member 47 and opens into the chamber 50. From the chamber 53 there extends a passage, generally indicated at 55, to the pilot outlet. It includes a port 56 extending downwardly and outwardly (Figs. 7 and 16 are views from the bottom) to another port 57 which registers with a port 58 in the valve body 20. The port 58 then communicates with a cross port 59 leading into the pilot outlet 60 to be described.

A small bleeder port 61 or other restricted passage extends from the port 43 into the chamber 23 below the diaphragm.

From the foregoing it may be seen that the upper chamber 39 above the diaphragm is closed save for escape through the passage 40 to the chamber 50. The chamber 50 communicates with the chamber 53 under control of the cut-off valve 46, and the chamber 53 has its outlet through the passage 55, and the pilot outlet 60. A restricted communication between the upper and lower chambers about the diaphragm is obtained through the bleeder passage 61.

The pilot outlet 60 is connected to the inlet chamber 25. In the upper back wall of the inlet chamber viewed in Fig. 2 the pilot outlet is located (Fig. 18). A port 63 extends into the chamber 25 and intersects a cross port 64 having a shoulder therein engaged by an adjustable needle valve 65. The port 64 leads into a space 66 into which is connected the pilot outlet. It will be observed that the port 59 connects into the space 66 so that the release of the diaphragm is obtained by a discharge through the pilot.

The diaphragm valve 28 is seated on its seat 27 by means of gravity assisted by a coil spring 68. Through the center of the valve 28 there extends an adjustable screw 69 secured in adjusted position by a lock nut 70. A plug 71 in the top of the cover 24 makes accessible the screw 69 and the nut 70. It will be observed that when the diaphragm valve is closed, the line gas pressure beneath the diaphragm acts on an annulus between the valve seat 27 and the walls of the housing. When this valve is lifted, however, the gas may act on the lower surface of the valve itself in addition. The effect of this is to make the diaphragm valve require a higher pressure to open than to be held open. Therefore, it will remain open until the cut-off valve closes to reduce the pressure to a point lower than the pressure required to open it.

The screw 69 on the diaphragm valve operates the expander valve 32. This expander valve has a circular valve head 72 closing a port 73 leading from the chamber 32 to the outlet 22. The head 72 is secured to a lever 74 pivoted at 75 to a bracket 76 fastened to the housing. A coil spring 77 urges the lever 74 down to close the valve.

A second lever 78 is also pivoted at 75 and has depending therefrom opposed legs 79. A pivot rod 80 extends between the legs. A latch 81 is mounted on the pivot rod 80. This latch has a portion 82 struck out from its upper leg, the remainder of the upper leg passing through a slot 83 in the lever 74 and a slot 84 in the lever 78. The other arm of the latch 81 extends beneath an overhanging portion on the bracket 76. A coil spring 85 surrounds the pivot 80 and urges the latch clockwise.

A spring 86 stiffer than the spring 77 urges the lever 78 upwardly to follow the screw 69.

As the diaphragm lifts, the spring 86 causes the lever 78 to follow the screw 69. Since the spring 86 is stronger than the spring 77, the lever 74 will be caused to follow under the action of the latch element 82. When, however, the free arm of the latch 81 strikes the bracket 76, the latch will be urged counterclockwise against the spring 85 to free the element 82 into the slot 83, whereupon the spring 77 seats the valve.

Additional upward movement of the upper lever 78 lifts the latch 81, but as its end is held by the bracket 76, the latch turns until its upper leg strikes the back edge of the slot 84, arresting any further upward movement of the lever 78. Otherwise the said lever might rise to such point that the pivot 81 would impinge upon the lower lever 74 and again lift it to open its valve.

The modulating valve 34 has two identically sized valve heads 88 and 89 operating in identical valve ports 90 and 91, respectively. Each valve head has a four-legged spider, as shown in Fig. 8. The spiders are surmounted by cylindrical portions 92 and 93, respectively. As will be shown, normally the valve heads do not seat completely within the ports but permit a certain minimum flow of gas therethrough.

The valve heads are connected by an elongated stem 94 which has an axial hole therethrough threaded at one end. A rod 95 passes through this hole and is secured to an enlarged threaded portion 96 engaging the corresponding portion of the stem 94. The member 96 passes through the diaphragm 49 and has a squared end slipped into a squared socket within a valve head 97 seated upon the valve seat 51 previously described. A kerf 98 on the outer end of the valve head 97 receives the spatulate end of a rod 99 rotatably fitting in the cover 47. A pointer 100 is secured over the end of the rod 99 and engages against a stop 101 on the cover 47. The rod 99 is kerfed to receive a screw-driver for adjustment. A cap 102 is threaded over the end 99 but has an opening 103 to permit a screw-driver to have access to the kerf of the rod.

It will be seen that rotation of the rod 99 rotates the valve head 97 which, in turn, rotates the threaded portion 96 in the valve stem 94 to advance or to withdraw valves 88 and 89 relative to the valve 97. A coil spring 104 extends between the valve head 97 and the washer over the rod 99. This spring urges the valve head 97 toward the seat 51.

The rod 95 and hence the valves 92, 93 and 97 are operated by a heat controlled mechanism now to be described. A bell crank 110 (Fig. 7) is pivoted at 111 about a pivot supported in depending ears of a bracket 112. This bracket is secured on the inner face of a plate 113 held between a cover 114 and the valve housing 20. A torsion spring 115 extends around the pivot 111 and at one end maintains the lever 110 against the rod 95. The free ends of the spring 115 impinge upon the plate 113.

A second pivot 116 is likewise mounted between the ears of the bracket 112. A lever 117 having turned up flanges is mounted on the pivot 116. This lever has an offset end portion 118 (Figs. 9 and 12) that overlies one end of the lever 110.

A third pivot 119 is mounted between ears on the bracket 112. A lever 120 similar to the lever 117 is mounted on the pivot 119 and it has an offset end 121 lying alongside the end 118 of the lever 117 so as likewise to rest against the end of the lever 110. Thus, upon swinging out of either the lever 117 or the lever 120, the lever 110 will be pivoted against the spring 113 and away from the rod 95 so that the valves 88, 89 and 97 approach their seats under action of the spring 104.

The two lever 117 and 120 are respectively operated by thermal devices, indicated at 123 and 124, identical in details. Each of these thermal devices includes a cup-like member 125. These cup-like members are secured by their flanges between the cover 115 and the housing 20. A second cup-like element 126, flexible so as to act as a diaphragm, is closely interfitted within the cup-like member 125 so as to be normally contiguous thereto throughout its extent, and is sealed, such as by welding, toward the open end of its side walls. A tube, preferably of capillary size, at 127 extends through the cup-like member 125 at its edge so as to communicate between the cup-like member 125 and the diaphragm 126.

The tube 127 of the device 123 terminates in a bulb 128 and the tube of the device 124 in a bulb 129. The bulbs, tubes, and cup spaces are preferably completely filled with a liquid, and most desirably one that remains a liquid throughout the temperature ranges of operation.

An actuating plunger 133, having a flange 134 near one end fits within each of the cup-like elements and is urged into contact with the center of the diaphragm element 126 by a conical coil spring 135. This spring engages between the plate 113 and the flange 134. Suitable openings in the plate 113 and the bracket 112 permit the plungers 133 to pass through them to adjacent the respective levers 117 and 120. Through each of these levers there passes a set screw 136 pointed to engage in frictionless contact with the socketed end of the plunger 133. A lock nut 137 maintains each set screw 136 in adjusted position.

It will be seen thus far that expansion of either diaphragm 126 forces its plunger 133 against its spring 135 to press its set screw 136 outwardly, thereby to deflect its lever 117 or 120.

An additional adjustment is provided for each device in a set screw 138 that passes through the cover 115. Each of these set screws has a pointer 139 on its outer end, operating over graduations on a plate 140 bolted onto the cover 115. The pointer on the thermal unit 123 is graduated in degrees, whereas that on the unit 124 is shown to indicate the direction for adjustment for warmer or cooler temperatures. Turning of these set screws bodily displaces the disc-like ends of members 125 and 126 relative to the levers 117 and 120, to give a preliminary relation between the members and their levers, regardless of the heat conditions of the liquid.

The bulb 128 on the unit 123 has extending therefrom a second tube 142. This tube extends through an additional cup-like member 143 (Figs. 14, 15) that has a diaphragm cup 144 secured within it. A cap 145 is attached to the flanges of the cup 143. The cap is centrally threaded to receive a screw 146 having a handle 147 thereon. A depending finger 148 on the handle is designed to strike limit posts 149 and 150. The screw 146 has on the end thereof a cap 151 rotatably mounted to abut the flexible diaphragm 144 at its center.

This thermal control, comprising a "solid-charge" thermostat system, moves each lever 117 or 120 to a definite and invariable position for each temperature condition, as the liquid expands or contracts without compression. Hence the power of the thermal units is substantially limitless, and regardless of variations in the resistance to expansion, the expansion will occur. In a modulating valve it is critical that the valve always assume the same position for any temperature condition. Only with an invariable thermal unit can such invariability be obtained.

The use of the device is as follows:

The bulbs of the thermal elements may be located at any proper points whose temperatures are critical. For instance, the bulb 128 may be located in the room being heated, and the bulb 129 may be located in the furnace bonnet.

Referring to the diagram of Fig. 19, gas enters the inlet 21 and into the main valve 20 at which point it is checked by the main diaphragm valve. If it be assumed that both of the thermal controls 123 and 124 are in cold position, the bell crank 110 will be close to the modulating valve. In this position, the cut-off valve 46 will be open, and with it the modulating valve 34. Gas from behind the diaphragm may then escape through the passage 40, through the open cut-off valve 46, through the passage 55 and out the pilot line 60, bringing the pilot flame up. The pressure above the diaphragm is thereby reduced to atmosphere. The pressure below the diaphragm is the line pressure which is above atmosphere and thereby the diaphragm is lifted, opening its valve. The earlier part of this lifting opens the expander valve momentarily, enabling a charge of gas to pass through the expander valve into the passage 73 to the outlet 22 to the main burner, which thereby immediately ignites with an ample charge of gas, unrestricted by the modulating valve. However, this expander valve closes when the diaphragm approaches its upper limit cutting off the direct passage of line gas from the inlet to the main burner and leaving the main burner under control of the modulating valve. Although a large charge of gas is required to initiate a flame, a substantially smaller amount will sustain it. The expander valve admits this larger amount for ignition of the burner, which then may continue to run on the lesser amount admitted through the modulating valve.

With the diaphragm up, gas passes into the passage 33 and up to the modulating valve 34. The extent of opening of the modulating valve will be governed by the degree of coldness of the thermal elements. However, the valve is desirably adjusted so that it will always be open an amount sufficient to sustain a flame in the main burner. With this valve open, gas flows through the passages 90 and 91 to the outlet 22 of the main burner, furnishing an amount of gas adequate to supply the degree of heat required. The position of the modulating valve may be varied by the thermal elements.

At all times gas flows through the passage 63 past the needle valve 65 and out the pilot line 60 to maintain a pilot flame.

When either thermal element expands, bell crank 110 will move away from the modulating valve, permitting it to move toward closed position, reducing the supply of fuel to the main burner. If the movement of the bell crank exceeds a predetermined amount, the cut-off valve 46 will move to closed position checking the exhaust line from behind the diaphragm. Then the line pressure from ahead of the diaphragm passing through the bleeder port 61 to behind the diaphragm will balance pressure on the diaphragm and permit its valve to be closed by its weight, assisted by the spring. Prior to its closing, there continues to flow past the modulating valve sufficient fuel to maintain a flame, since the modulating valve desirably never cuts the fuel line beyond such minimum. Owing to the previously mentioned area differential of the effective surface of the diaphragm when open and when cold, the cut-off valve will move to a much more closed position before the diaphragm falls than the position at which it is lifted. This, of course, means that the temperature of the controlling thermal elements is higher to close the valve than to open it. This differential prevents chattering of the valve.

Usually the bonnet thermostat is employed as a limit switch to prevent overheating of the furnace. In this case it is set to a temperature that is above those it normally encounters. This leaves the normal operation of the device under control of the room thermostat, but with the valve subject to closure if the bonnet attains an excessive temperature, regardless of the heat of the room.

In the cycling of the valve, the room thermostat will gradually change its conditions, and the supply of gas will be modulated directly with these changes, so long as the room heat does not exceed the cut-off value. The differential of the diaphragm valve leaves a range of temperatures in which the modulating valve can operate without cutting off. Any overrunning of the heating plant is eliminated, because of the modulation of the plant, as contrasted with a simple cut-off that allows a fixed supply of fuel at all times the burner is in operation. This fixed supply heats up the furnace before the room heats, until when the room thermostat cuts off, the furnace is so hot that it will continue to supply heat to the room in excess of the amount desired. Conversely, when the room cools with a fixed supply which has been cut-off for an interval, the furnace does not heat up to warm the room for an additional period, during which the room has cooled further.

Referring back to the detailed drawings, the operations of the several mechanisms may be considered more fully.

The adjustments of the temperatures of operation may be made for the room thermostat by turning the knob 147. The cap 145 desirably is graduated, as shown in Fig. 15, for this purpose. In order to calibrate these graduations the set screw 138, with its pointer 139 of this thermostat may be adjusted to make the temperatures indicated by the knob 147 proper ones. This adjustment not only changes the temperature of operation of the cut-off valve, but it correspondingly adjusts the modulating valves. If the room thermostat is adjusted to a higher temperature, the cut-out valve will be opened further and will close later. Also the modulating valves will be opened further to pass the greater volume of gas necessary to supply the added heat to the room.

The thermal unit 124 may be adjusted by turning its pointer 139 to the proper place on its scale. The turning of the pointer 139, which is effected by adjusting the set screws 138, mechanically displaces the bottoms of the cup members 125 and the diaphragms 126 relative to the levers 117 and 120. The presence of the set screws 138 prevents recoil expansion of the cup members 125 which desirably are stiffer than the diaphragm elements 126. By this means all of the expansion of the liquid takes effect in displacement of the diaphragm elements 126.

The two levers 117 and 120 may be adjusted relative to the diaphragm by the set screws 138. By this means they may not only be coordinated, but also the point of closing of the cut-off valve 46 may be further adjusted. Of course, the screws 138 and the knob 147 also adjust this point.

The modulating valves 88 and 89 are attached to the stem 94 of the cut-off valve. Hence they follow the movements of the cut-off valve, and are moved by the movements of the thermal devices to establish a fluid flow determined by the requirements of these devices.

The cut-off valve is first adjusted to open and close at the desired temperature point. Then the rod 99 is adjusted, shifting the modulating valves over the rod 95 so that for a given temperature condition they are located relative to their seats so as to give the proper flow of fluid. As mentioned, they are slightly open even with the cut-off closed entirely, so as to supply the minimum amount of fuel to sustain a flame whenever any fuel is passing the diaphragm valve. It is possible to adjust them completely to close, or never to cut down on the gas supply. The latter removes the modulating effect and renders the mechanism merely a cut-off valve, which is a desirable characteristic for some occasions.

The adjustment of the modulating valves relative to the cut-off valve is indicated by the pointer 100, and limited by the stop 101.

As the diaphragm valve opens, the expander valve cycles. This expander valve operation may be caused to commence immediately upon the beginning of the lifting of the diaphragm valve, or it may be caused to lag, depending upon adjustment of the screw. Ordinarily it will be operated so as to have the surge of ignition gas at the burner at the same time the restricted flow from the modulator arrives to sustain the flame.

The modulating valves are balanced one against the other so that the gas pressure has no effect upon the operation of the mechanism.

What is claimed is:

1. In a mechanism of the kind described, a flow line, a main valve, a modulating valve in the line adapted to restrict the flow, means to cause the main valve to open, and means by-passing the modulating valve for a limited interval, and means interconnecting the valve opening means and the by-passing means to operate the by-passing means upon opening of the main valve.

2. In a mechanism of the kind described, a flow line, a main valve, a second valve in the line subsequent to the main valve, a by-pass valve connected between the main and second valves, and having an outlet passage subsequent to the second valve, means opening the by-pass valve as the main valve opens, and means causing the by-pass valve to close after a limited interval.

3. In a mechanism of the kind described, a main valve adapted to be displaced, an additional valve, means causing said additional valve to open with displacement of the main valve, and means releasing the additional valve for closing by the time the main valve reaches its maximum displacement.

4. In a mechanism of the kind described, a main valve, an additional valve, a pair of levers, means causing the first lever to follow movements of the main valve, a latch between the levers causing the second lever to follow the first, and means tripping the first lever whereby it may return upon movement of the main valve a given distance, the additional valve being controlled by the freed lever.

5. In a mechanism of the kind described, a fluid flow line, a diaphragm valve in the line, a modulating valve in the line, an exhaust line to relieve the diaphragm valve, a cut-off valve in said exhaust line, said cut-off valve and said modulating valve being axially arranged on the same stem, means adjusting the modulating valve relative to the cut-off valve, said valves being so related that the cut-off valve closes upon movement of the modulating valve to a predetermined position.

6. A valve assembly including a housing having an inlet chamber, an outlet chamber, a diaphragm valve and a modulating valve successively interposed between the inlet and outlet chambers, an exhaust line to relieve pressure back of the diaphragm, a cut-off valve chamber in said housing, a cut-off valve in said chamber, a stem common to the modulating valve and the cut-off valve and centrally disposed relative to both, and means sealing the cut-off valve chamber from the modulating valve.

7. In a mechanism of the kind described, a space heater having a heated chamber, a main burner, a pilot burner, a control for said main burner including a cut-off, a first thermal element responsive to heat conditions in the heated chamber, a second thermal element responsive to heat conditions in the space being heated, and means transmitting the independent movements of both thermal elements to the cut-off to move it in response to heat changes in either the chamber or the space.

8. In a mechanism of the kind described, a valve casing having ingress and egress lines, a main valve movable from closed to open position, said valve being interposed between the ingress and egress lines, a second valve between the said lines, means to open the second valve, actuated by said movement of the main valve, means to disengage the opening means after a predetermined displacement of the main valve, and said second valve being thereupon caused to close.

9. In a mechanism of the kind described, a valve casing having ingress and egress lines, a diaphragm valve and a valve seat therefor between said lines, control means operable to cause the diaphragm valve to lift from its seat, a second valve between the ingress and egress lines, relatively strong resilient means urging the second valve to move with movement of the main valve, latch means disengaging the strong means after a predetermined movement of the main valve, and relatively weak means thereupon operable to return the second valve to its first position.

10. In a mechanism of the kind described, a main valve adapted to be moved, a second valve, means causing the second valve to move in one direction upon movement of the first, means to release the first named means to enable the second valve to move in the return direction, and means to adjust the position of the main valve relative to the second valve.

11. In a mechanism of the kind described, a valve casing, a diaphragm valve therein, a second valve adapted to move with the diaphragm valve, a linkage between the valves to effect such movement, an adjusting screw in the diaphragm valve for altering relationship between the two valves, a removable plug in the casing to render the adjusting screw accessible.

12. In a mechanism of the kind described, a valve housing, a first valve therein, a second valve therein, connecting means movable with both valves and adapted to actuate both, one valve being adjustable on said connecting means by relative rotation therebetween, the other valve being axially but not rotatably movable relative to the connecting means, whereby adjustment of the connecting means may produce relative movement between it and the second valve, and rotation of the connecting means may produce adjustment of the first valve relative to the second valve and the connecting means.

13. In a mechanism of the kind described, a valve and means to move the same, said means including a pair of power means, a pair of first levers, said levers having adjacent free ends, and pivoted remote ends, a second lever contacting the first levers at their adjacent ends, and means adjustably connecting each of said first levers to one power means.

14. In a mechanism of the kind described, a casing, a valve therein, a pair of power means on the casing, each comprising a relatively rigid member fixed to the casing and a relatively flexible member united to the rigid member to form an expansible chamber by movement of the flexible member away from the rigid member, connecting means between each power means and the valve for operation of the valve by either, comprising a lever moved by each power means, an adjusting device between each lever and its power means, an additional lever moved by both other levers, and connected with the valve, and means to adjust each power means, including a member on the casing adapted to displace the rigid member relative to the casing.

15. In a mechanism of the kind described, a base, a power means having a relatively rigid member secured to the base at its periphery but capable of displacement inside the limits of its periphery, a relatively flexible member secured at its periphery to the rigid member and adapted to move at its center away from and back toward the rigid member, fluid between the two members to cause said movement, a device adjacent the flexible member to be moved upon such movement, and means attached to the base movable thereon to move the displaceable part of the relatively rigid member relatively to the moved device to provide adjustment thereof.

16. In a mechanism of the kind described, a base, a power means having a first member secured to the base at its periphery but capable of displacement inside the limits of its periphery, a second and flexible member secured at its periphery to the rigid member and adapted to move at its center toward and away from the rigid member, said two members forming between them an expansible chamber, fluid between the two members to cause said expansion, a device adjacent the second member to be moved upon the expansion, and means attached to the base and movable thereon to move the displaceable part of the first member relatively to the moved device to provide adjustment thereof.

17. In a mechanism of the kind described for use with a heating unit for heating a space, said unit having a fuel line, a valve mechanism for controlling said fuel line, including a housing, a valve in said housing, a limit control for controlling operation of the valve, said limit control having an expansible member in the casing connected with the valve, and a tube attached into the member and adapted to extend into the heating zone of the heating unit, and a second heat-responsive device responsive to temperature changes in the space being heated and connected to the valve for effecting an independent control of the same.

LAWRENCE M. PERSONS.